United States Patent
Kim et al.

(10) Patent No.: US 6,816,802 B2
(45) Date of Patent: Nov. 9, 2004

(54) OBJECT GROWTH CONTROL SYSTEM AND METHOD

(75) Inventors: Jay-woo Kim, Kyungki-do (KR); Kyung-hwan Kim, Kyungki-do (KR); Seok-won Bang, Seoul (KR); Mi-hee Lee, Kyungki-do (KR); Dong-geon Kong, Busan (KR); Hyoung-ki Lee, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 29 days.

(21) Appl. No.: 10/287,679

(22) Filed: Nov. 5, 2002

(65) Prior Publication Data

US 2003/0088367 A1 May 8, 2003

(30) Foreign Application Priority Data

Nov. 5, 2001  (KR) .............................. 10-2001-0068634

(51) Int. Cl.[7] .......................... G06F 19/00; G05B 19/04
(52) U.S. Cl. .......................... 702/131; 702/81; 702/84; 702/179; 700/245; 700/246
(58) Field of Search .............................. 702/19, 81, 84, 702/179, 182, 183; 700/245, 257, 258, 260, 246; 128/904, 905, 925; 600/301, 545

(56) References Cited

U.S. PATENT DOCUMENTS 5,676,138 A * 10/1997 Zawilinski .................. 600/301

6,347,261 B1 * 2/2002 Sakaue et al. .............. 700/245

FOREIGN PATENT DOCUMENTS

| JP | 11126017 | 5/1999 |
|----|----------|--------|
| WO | 00/66239 | 11/2000 |

OTHER PUBLICATIONS

Notice to Submit Response issued by the Korean Patent Office on Apr. 12, 2004 in corresponding application 10-2001-0068634.

* cited by examiner

Primary Examiner—Bryan Bui
(74) Attorney, Agent, or Firm—Burns, Doane, Swecker & Mathis, L.L.P.

(57) ABSTRACT

An object growth control system and method are provided. The object growth control system includes a weighting unit, a growth state analyzer, and an object operation controller. The weighting unit detects external environments and a user's state, loads weights on predetermined user emotional states, predetermined object growth tendencies, and predetermined object emotional states according to the result of detection and the user's tendency, and outputs the results of loading of the weights as state data. The growth state analyzer applies a predetermined statistical model to the state data input for a predetermined period to analyze the user's tendency and outputs a degree of education on the object with respect to the user's tendency based on the state data to which the predetermined statistical model has been applied. The object operation controller applies a predetermined rule-based or statistical model to the state data and the degree of education to generate a control signal for controlling the operation of the object.

19 Claims, 9 Drawing Sheets

OBJECT GROWTH CONTROL SYSTEM AND METHOD

CROSS-REFERENCE TO RELATED APPLICATIONS

This application claims the priority of Korean Patent Application No. 2001-68634, filed Nov. 5, 2001, which is incorporated herein in its entirety by reference.

BACKGROUND OF THE INVENTION

1. Field of the Invention

The present invention relates to an autonomous object growth control system, and more particularly, to a growth control system and method for reflecting a user's educational intention and emotional state based on a growth direction set by a user or an object.

2. Description of the Related Art

An object, here, indicates an instrument, apparatus, or autonomous device which recognizes an ambient environment and changes its operation according to the result of recognition. A user can let the object know user's desirable requirements by inputting predetermined mathematical values into an object. Then the object is controlled by the mathematical values and recognition results of ambient environment in order to give the user the performance which satisfies the user's desirable requirements.

However, the user might set his/her desirable requirements to improper mathematical values, because he/she does not know the exact proper mathematical value for his/her desire. For example, many users do not know the exact desirable temperature value for their air-conditioner when they feel hot. They are not sure which degree is suitable for them, even though they want to feel cool.

To overcome this problem, approaches in sensibility ergonomics have been developed, and some degree of user's satisfaction has been achieved even if user's requirements are vague. In other words, the object can perform properly even if the user gives vague order. For example, the user can set the air-conditioner to "little cooler than right now" instead of "19 degrees Fahrenheit".

Most of sensibility ergonomics approaches try to find the physical meanings of a user's vague requirements throughout previously performed tests on many persons. Products, developed by these sensibility ergonomics approaches, are usually set to average values obtained through tests performed by manufacturers. For example, manufacturers set the mathematical value for "little cooler than right now" as "5 degrees Fahrenheit less than the current temperature", because the average value of answers from pre-tested persons who are asked about "how low is good for 'little cooler than right now'?". Consequently, the performance of the products satisfies users' requirement in some level, but it is difficult to control the products to be really suitable for the characteristics of individual user.

To overcome this problem, products for recognizing an emotional state of a user in real time and reflecting the result of recognition to control of the product have been developed. However, these products grant much importance to the current degree of a user's satisfaction, so it is difficult to find the user's general tendency which it requires long term to catch. In other words, the performance in this kind of products may unreliably change according to the current temporal emotion of the user and may diverse. Most of users want to have the object which can react the user's current emotional state and the user's long term tendency and habit at the same time.

Therefore, a demand for products which can adapt itself to a user over a long term and always demonstrate reliable performance even for an abrupt change of the user's emotion, increases.

SUMMARY OF THE INVENTION

To solve the above-described problems, it is a first object of the present invention to provide an object growth control system and method for reflecting a current user's educational intention and emotional state based on a predetermined growth course.

It is a second object of the present invention to provide a recording medium in which the object growth control method is recorded in the form of program codes which can be executed in computers.

In accordance with a preferred embodiment of the present invention, there is provided an object growth control system for growing an object, which includes a weighting unit for detecting external environments and a user's state, loading weights on predetermined user emotional states, predetermined object growth tendencies, and predetermined object emotional states according to the result of detection and the user's tendency, and outputting the results of loading of the weights as state data; a growth state analyzer for applying a predetermined statistical model to the state data input for a predetermined period to analyze the user's tendency and outputting a degree of education on the object with respect to the user's tendency based on the state data to which the predetermined statistical model has been applied; and an object operation controller for applying a predetermined rule-based or statistical model to the state data and the degree of education to generate a control signal for controlling the operation of the object.

There is also provided an object growth control system for growing an object, which includes a tendency selector for setting a plurality of growth tendencies, which the object can be educated or controlled to have, as object growth tendencies and providing at least one object growth tendency selected by a user; a weighting unit for detecting external environments and a user's state, loading weights on predetermined user emotional states, predetermined object growth tendencies, and predetermined object emotional states according to the result of detection and the selected object growth tendency, and outputting the results of loading of the weights as state data; a growth state analyzer for applying a predetermined statistical model to the state data and outputting a degree of education on the object with respect to the selected object growth tendency based on the result of application; and an object operation controller for applying a predetermined rule-based or statistical model to the state data and the degree of education to generate a control signal for controlling the operation of the object.

In accordance with another preferred embodiment of the present invention, there is provided an object growth control method for growing an object, which includes detecting external environments and a user's state, loading weights on predetermined user emotional states, predetermined object growth tendencies, and predetermined object emotional states according to the result of detection and the user's tendency, and outputting the results of loading of the weights as state data; applying a predetermined statistical model to the state data input for a predetermined period to analyze the user's tendency and outputting a degree of education on the object with respect to the user's tendency based on the state data to which the predetermined statistical model has been applied; and applying a predetermined rule-based or statistical model to the state data and the degree of education to generate control signals for controlling the operation of the object.

There is also provided an object growth control method for growing an object, which includes setting a plurality of growth tendencies, which the object can be educated or controlled to have, as object growth tendencies; requesting a user to select at least one object growth tendency among the set object growth tendencies; detecting external environments and a user's state and loading weights on predetermined user emotional states, predetermined object growth tendencies, and predetermined object emotional states according to the result of detection and the selected object growth tendency to generate weighted state data; applying a predetermined statistical model to the state data and calculating a degree of education on the object with respect to the selected object growth tendency based on the result of application; and applying a predetermined rule-based or statistical model to the state data and the degree of education to generate a control signal for controlling the operation of the object.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Hereinafter, preferred embodiment of an object growth control system and method will be described with reference to the attached drawings. Moreover, we call the adaptation level to user's desirable requirements comprising emotional state and educational intention as growth level. We also call user's long term tendency regarding desirable requirements as growth course. User or the object itself can set its growth course before the object is working.

Figure 1:
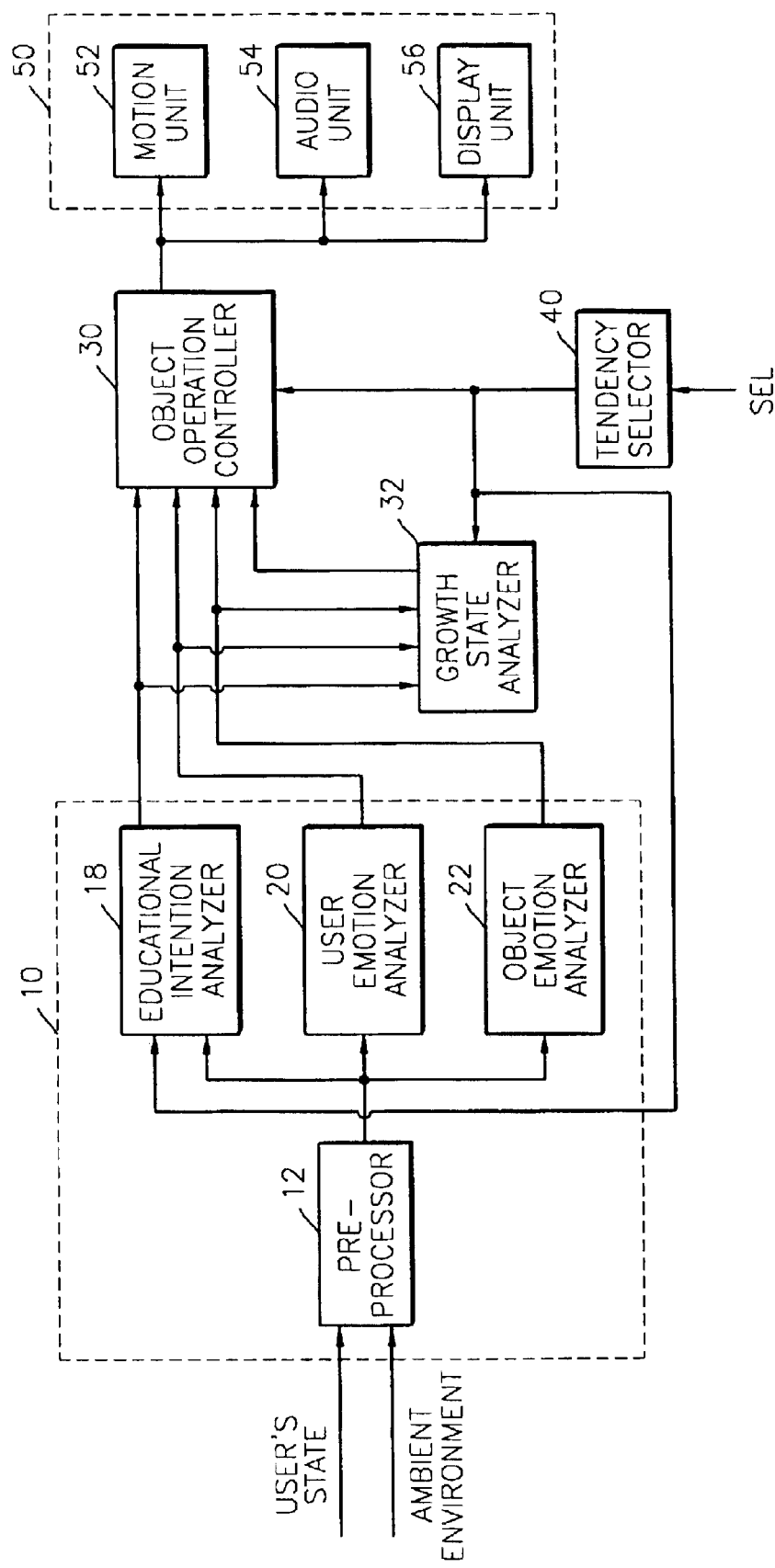
FIG. 1 is a schematic block diagram of an embodiment of an object growth control system according to the present invention.

FIG. 1 is a schematic block diagram of an embodiment of an object growth control system according to the present invention. The object growth control system includes a weighting unit 10, a growth state analyzer 32, an object operation controller 30, a tendency selector 40, and a reacting unit 50.

The tendency selector 40 selects one of instinct tendencies which an object is grown to have, in response to an external selection SEL. In other words, various tendencies which an object can be grown to have are set in the tendency selector 40, and these tendencies are displayed to allow a user to select one of them. These growth tendencies of an object can be appropriately set according to a field to which the object growth control system is applied. For example, if an object to be grown is a pet robot, smart, foolish, gloomy, and cheerful tendencies can be previously set, and a user can select one of them. If an object is an air conditioner, tendencies can be set as inconstant, mild, and immediately changing according to a user's feeling.

The weighting unit 10 detects an external environment and a user's state, loads weights on predetermined user emotional states, predetermined object growth tendencies, and predetermined object emotional states according to the result of detection and the user's tendency, and outputs the weighted user emotional states, the weighted object growth tendencies, and the weighted object emotional states as weighted state data. Referring to FIG. 1, the weighting unit 10 includes a pre-processor 12, an educational intention analyzer 18, a user emotion analyzer 20, and an object emotion analyzer 22.

The pre-processor 12 senses a user's state and a state of an ambient environment and converts the result of sensing into information indicating a state or emotion of a user or an object. For example, the pre-processor 12 converts sensed user and environment information into information indicating a user's educational intention for an object and the user's emotional state based on the user's physiological signals corresponding to sweat, body temperature, a pulse rate, and blood pressure, etc., a visual signal corresponding to the user's facial expression and gesture and the ambient environment picked up by a camera, a tactile signal which can be acquired through a tactile sensor, an audio signal corresponding to the user's speech and sound, and a character signal input by the user. For example, when a scene that a user raises the clenched fist with a stern look is picked up by a camera, the pre-processor 12 converts a visual signal corresponding to the scene into information indicating that the user scolds an object for its behavior. In addition, the pre-processor 12 extracts information which can influence an emotional state of the object from a visual signal corresponding to an environment picked up by the camera including brightness, color, stairs, and sharp edge, etc., and audio signals corresponding to music, noise, high frequency components, low frequency components, and pitches, etc., input from the ambient environment and converts the extracted information into information indicating an emotional state of the object. For example, when it is dark around and the darkness is continued for a long time, the pre-processor 12 converts a visual signal corresponding to this environment into information of "fear".

The educational intention analyzer 18 loads weights on predetermined object tendencies according to the information indicating a user's state or emotion generated from the pre-processor 12, the user's tendency, and the object growth tendency selected by the tendency selector 40 and outputs the weighted object tendencies. For example, the educational intention analyzer 18 loads high weights on components that agree with the user's tendency or the selected object growth tendency among the output components of the pre-processor 12 while loading low weights on output components that do not agree with it to grow the object to have the user's tendency or the selected object growth tendency. The user's tendency indicates an object growth tendency showing a highest educational effect during a predetermined initial period when the user does not select a particular object growth tendency through the growth selector 40. For example, if an effect of education on smartness is highest among the effects of education on object growth tendencies such as smartness, gloominess, and foolishness, etc., during a predetermined initial period, the user's tendency is determined as smartness, and the object growth tendency is also determined as smartness, so the object is grow to have a smart tendency.

The user emotion analyzer 20 loads weights on the predetermined user emotional states according to the information indicating the user's state or emotion output from the pre-processor 12 and outputs the weighted user emotional states. More specifically, the user emotion analyzer 20 is provided with parts for data fusion like a neuropil structure to output the result values of generally determining the user's current emotional state. For example, the user emotion analyzer 20 can output weighted emotions such as happiness, sadness, angriness, neutral, surprise, and horror which are representative human emotions.

The object emotion analyzer 22 loads weights on predetermined object emotional states according to information indicating the object's state or emotion, which has no relation with the user's emotion, using the output of the pre-processor 12 and outputs the weighted object emotion states. Similarly, the object emotion analyzer 22 is provided with a part for data fusion like a neuropil structure to output the result values of generally determining the object's current emotional state. For example, the object emotion analyzer 22 can output weighted emotions such as happiness, sadness, angriness, neutral, surprise, and horror.

The growth state analyzer 32 outputs a degree of education, which indicate to what degree the object is educated to agree with the object growth tendency selected by the tendency selector 40, based on state data output from the weighting unit 10. Alternatively, the growth state analyzer 32 accumulates state data output from the weighting unit 10 during a predetermined initial period to analyze the user's tendency and outputs a degree of education on the analyzed user's tendency. As described above, the user may not select an object growth tendency which the object is to be grown to have in the tendency selector 40. In this case, the growth state analyzer 32 determines a tendency of the object showing a highest educational effect as a user tendency based on the state data input during a predetermined period. More specifically, the degree of education on the user tendency or object growth tendency can be obtained by reflecting a currently input value upon values input until that time using the neuropil structure or performing integration at regular intervals. If the object receives inputs agreeing with the selected object growth tendency from the ambient environment or the user, the degree of education on the object growth tendency is high. In contrast, if the object receives inputs not agreeing with the selected object growth tendency from the ambient environment or the user, the degree of education on the object growth tendency is low.

The object operation controller 30 combines the state data output from the weighting unit 10 according to the degree of education and generates a control signal for controlling the operation of the object based on the combined result. Control of the object based on the combined result can be performed by a rule-based method in which, for example, a particular operation is made when some inputs satisfy a predetermined condition, or can be performed using a statistical model. In using a statistical model, if a combination of inputs determines probabilities of various operations, and another combination of inputs determines probabilities of other operations. When there is no combination which can be made of inputs, all probabilities determined for each operation are summed, and an object is controlled to perform an operation having the highest result value of summation.

The reacting unit 50 is controlled in response to the operation control signal output from the object operation controller 30. The reacting unit 50 includes a motion unit 52, an audio unit 54, and a display unit 56.

The motion unit 52 generates a motion corresponding to the operation control signal. The audio unit 54 generates a sound corresponding to the operation control signal. The display unit 56 generates a visual reaction corresponding to the operation control signal. For example, in the case where the object is a robot, the reacting unit 50 can include a light emitting diode (LED) as the display unit 56, a speaker as the audio unit 54, and a motor as the motion unit 52. Here, the object blinks the LED, generates a sound through the speaker, and moves its arms or legs by driving the motor in response to the operation control signal.

Hereinafter, the operations of an object growth control system according to the present invention will be described in detail with reference to FIG. 1.

A target of growth, i.e., an object growth tendency is selected in the tendency selector 40. Various growth tendencies can be set according to an object to be grown. Among these various growth tendencies, one or more growth tendencies can be selected by a user, or no growth tendencies can be selected.

After the object growth tendency is selected in the tendency selector 40, the weighting unit 10 senses signals related to the user's current intention or emotion and extracts information about the user's educational intention and emotional state from the sensed signals. In addition, the weighting unit 10 generates the user's educational intention and emotional state as state data using the extracted information. In order to analyze general environment, the weighting unit 10 converts various sensed results having no relation with the user into information influencing formation of the emotions/tendencies of the object and generates outputs, which are related to emotions such as happiness, sadness, and angriness, as state data.

The growth state analyzer 32 analyzes the user's educational intention and emotion and the emotions of the object, which are output from the weighting unit 10, using a predetermined statistical model in response to the object growth tendency selected in the tendency selector 40 and detects a growth state using the result of analysis. Then, the object operation controller 30 receives the user's educational intention and emotion and the emotions of the objects from the weighting unit 10 and generates operation control signals for controlling the operations of the object referring to the growth state of the object and the selected object growth tendency.

Meanwhile, as described above, a plurality of tendencies can be selected as object growth tendencies through the tendency selector 40. When a plurality of tendencies are selected, the growth state analyzer 32 loads higher weights on the selected object growth tendencies in order to prevent dispersion of a system output. For example, dispersion of a system output can be prevented by making the sum of weights on the selected object growth tendencies greater than the sum of weights on unselected growth tendencies. No object growth tendencies may be selected in the tendency selector 40. In this case, the educational intension analyzer 18 loads a high weight on a tendency having a highest degree of education during a predetermined initial period, thereby preventing dispersion.

In an object growth control system of the present invention, learning can be performed to make an object do operations agreeing with a user's request more quickly. In order to teach an object, a user's reaction is detected by the user emotion analyzer 20, and the result of detection is reflected upon the educational intention analyzer 18. In order to analyze the user's educational intention more accurately, the educational intention analyzer 18 can receive the output of the growth state analyzer 32 or the object operation controller 30 and can reflect it upon analysis of educational intention. In the case where the user's educational intention can be positively detected, the output of the educational intention analyzer 18 can be fed back to the user emotion analyzer 20 to allow the user's educational intention to be reflected upon analysis of the user's emotion, so that the educational intention analyzer 18 more effectively analyzes the user's emotion.

In such above-described object growth control system of the present invention, if a stop command is not input by a user after an object growth tendency selected by the user is formed to satisfy a predetermined condition, growth of the object is continued. The system can be dispersed due to the continuous growth of unselected tendencies. Accordingly, the growth state analyzer 32 can be designed to automatically generate a growth stop command or change the selected object growth tendency when it is determined that the selected object growth tendency reaches a predetermined level so that the object can be newly grown.

As described above, according to an object growth control system of the present invention, a user can select one or more particular growth tendencies from among variously set object growth tendencies and make an object be educated to have the selected tendency or tendencies, that is, grow the object according to his/her educational intention. In addition, even if the user does not select a particular object growth tendency, an object growth control system automatically analyzes the user's tendency and educates the object according to the analyzed user's tendency, thereby increasing the degree of the user's satisfaction on the object.

Such above-described object growth control system of the present invention can be applied in various ways. Representatively, the cases where an object growth control system of the present invention is applied to a robot and an air conditioner will be described in detail.

First, the case where the object growth control system shown in FIG. 1 is applied to a robot will be described with reference to the attached drawings.

Figure 2:
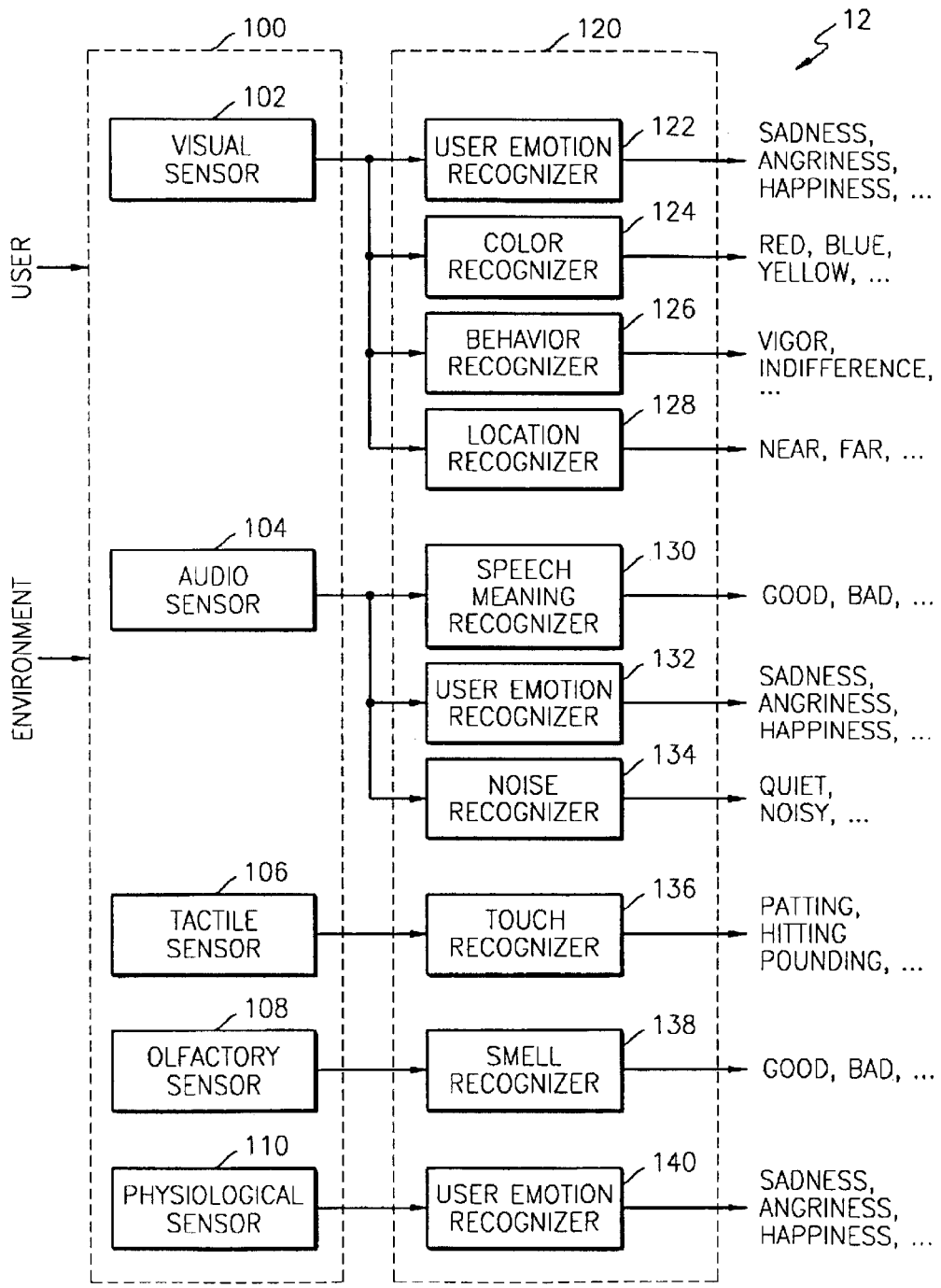
FIG. 2 is a detailed block diagram of an embodiment of a pre-processor of a weighting unit shown in FIG. 1.

FIG. 2 is a detailed block diagram of an embodiment of the pre-processor 12 of the weighting unit 10 shown in FIG. 1. The pre-processor 12 includes a sensor unit 100 and a processor unit 120. Referring to FIG. 2, the sensor unit 100 senses a user's state and a state of an ambient environment, converts them into electrical signals, and outputs the converted electrical signals to the processor unit 120. The sensor unit 100 includes a visual sensor 102, an audio sensor 104, a tactile sensor 106, an olfactory sensor 108, and a physiological sensor 110.

The visual sensor 102 is a sensor acting as the eyes of the robot and senses the user's state and a state of an ambient environment, for example, the user's motion, the color of the ambient environment, the user's behavior, and the user's location.

The audio sensor 104 is a sensor acting as the ears of the robot and senses speech spoken by the user and sound from the ambient environment.

The tactile sensor 106 senses the user's touch on the robot.

The olfactory sensor 108 senses ambient smell, and the physiological sensor 110 senses the user's physiological state, for example, sweat, body temperature, pulse rate, and blood pressure.

The processor unit 120 converts the sensing results of the sensor unit 100 into information indicating the user's education intention, information indicating the user's emotional state, or information indicating an emotional state of the robot.

Referring to FIG. 2, a user emotion recognizer 122 of the processor unit 120 recognizes the user's emotional state such as sadness, angriness, or happiness from the user's facial expression among the sensing results of the visual sensor 102 and outputs the result of recognition.

A color recognizer 124 recognizes the color of an ambient environment such as red, blue, or yellow from the sensing results of the visual sensor 102 and output the result of recognition.

A behavior recognizer 126 recognizes a state of the user's behavior such as vigor or indifference from the sensing results of the visual sensor 102 and output the result of recognition.

A location recognizer 128 recognizes the user's location with respect to the robot such as whether the user is far from or near the robot from the sensing results of the visual sensor 102 and output the result of recognition.

A speech meaning recognizer 130 recognizes the meaning of speech spoken by the user from the sensing result of the audio sensor 104 and outputs the result of recognition.

A user emotion recognizer 132 recognizes the user's emotional state such as sadness, angriness, or happiness from the user's way of speaking among the sensing results of the audio sensor 104 and outputs the result of recognition.

A noise recognizer 134 recognizes noise except the speech spoken by the user as being quiet or noisy and outputs the result of recognition.

A touch recognizer 136 recognizes a type of user's touch sensed by the tactile sensor 106, for example, patting, hitting, or pounding, and outputs the result of recognition.

A smell recognizer 138 recognizes smell as being good or bad from the sensing result of the olfactory sensor 108 and outputs the result of recognition.

A user emotion recognizer 140 recognizes the user's emotional state such as sadness, angriness, or happiness from the sensing results of the physiological sensor 110 such as sweat, body temperature, pulse rate, and blood pressure and outputs the result of recognition.

Figure 3:
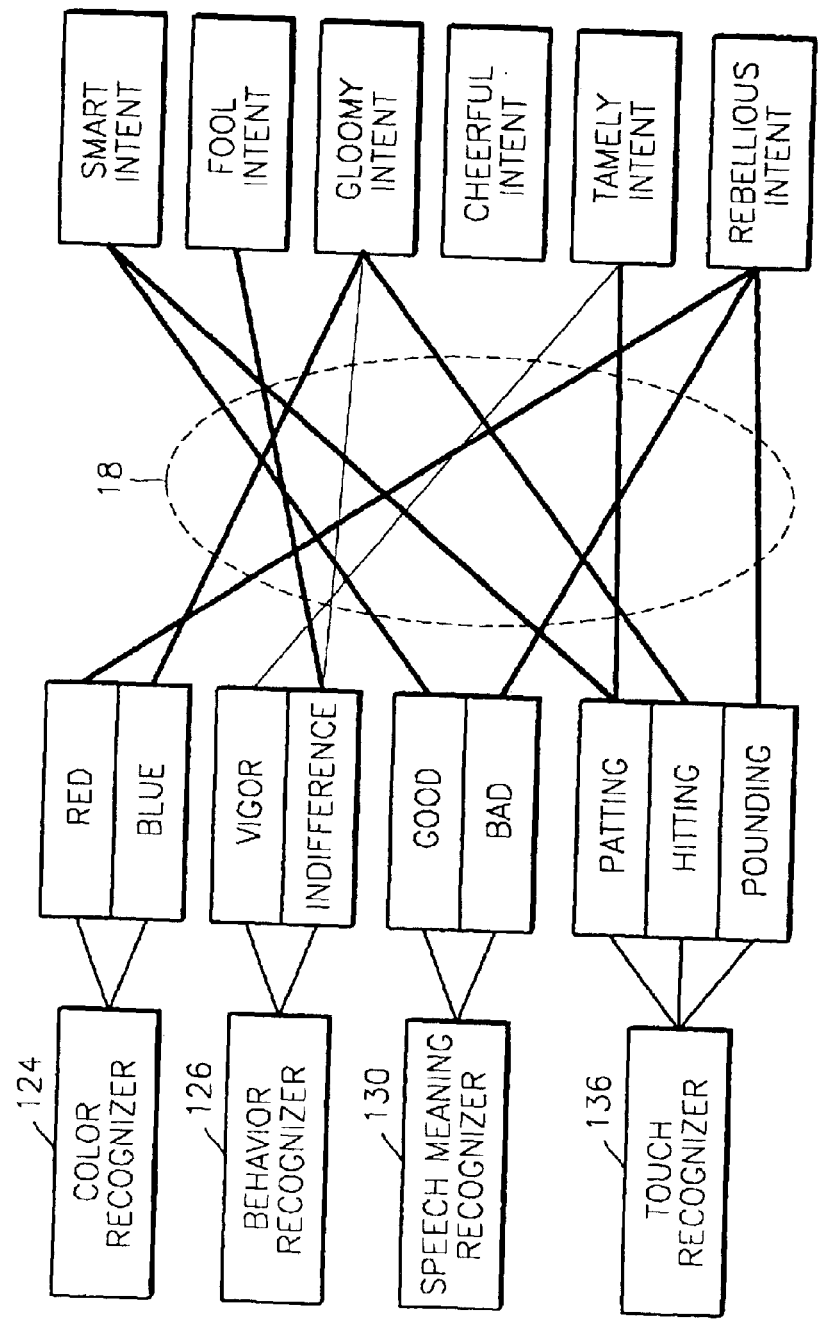
FIG. 3 is a diagram showing an embodiment of a weighting procedure performed in an educational intention analyzer shown in FIG. 1.

FIG. 3 is a diagram showing an embodiment of a weighting procedure performed in the educational intention analyzer 18 shown in FIG. 1. FIG. 3 shows how the educational intention analyzer 18 analyzes a user's educational intension using the results output from the color recognizer 124, the behavior recognizer 126, the speech meaning recognizer 130, and the touch recognizer 136. Alternatively, according to circumstances, the user's educational intention can be analyzed using the results output from other recognizers. In FIG. 3, the amounts of weights loaded by the educational intention analyzer 18 are discriminated by the thickness of the lines. For example, a thick line indicates a high weight, and a thin line indicates a low weight.

Referring to FIG. 3, when the color recognizer 124 recognizes red and blue, the educational intention analyzer 18 loads weights on predetermined tendencies corresponding to red and blue colors, respectively, according to degrees of influences of the respective red and blue colors on an object's corresponding tendencies. For example, the educational intention analyzer 18 loads a weight on a rebellious tendency according to a degree of influence of the red color on the rebellious tendency and loads a weight on a gloomy tendency according to a degree of influence of the blue color on the gloomy tendency. As described above, the amounts of weights loaded according to degrees of influences on object growth tendencies are discriminated by the thickness of the lines shown in FIG. 3. Similarly, if the user's behaviors are recognized as vigorous and indifferent, and if the vigorous behavior influences tamable and rebellious tendencies and the indifferent behavior influences foolish and gloomy tendencies, the behavior recognizer 126 loads weights on tamable, rebellious, foolish, and gloomy tendencies according to degrees of influences of the user's vigorous and indifferent behaviors on these tendencies. Similarly, the speech meaning recognizer 130 and the touch recognizer 136 load weights on relevant object growth tendencies according to the result of recognition.

Figure 4:
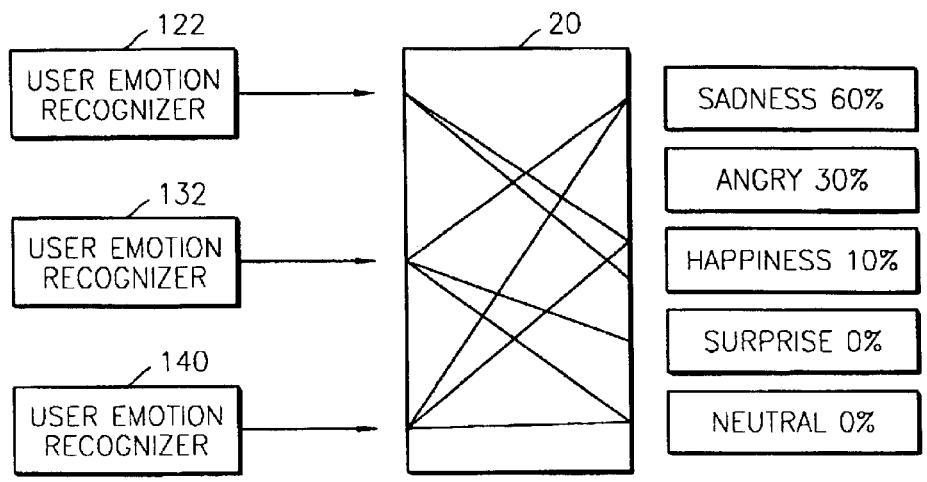
FIG. 4 is a diagram showing an embodiment of a procedure of analyzing a user's emotion performed by a user emotion analyzer shown in FIG. 1.

FIG. 4 is a diagram showing an embodiment of a procedure of analyzing a user's emotion performed by the user emotion analyzer 20 shown in FIG. 1. FIG. 4 shows how the user emotion analyzer 20 analyzes the user's emotion using the recognizing results output from the user emotion recognizers 122, 132, and 140. Alternatively, according to circumstances, the user's emotion can be analyzed using the results output from other recognizers.

Referring to FIG. 4, the user emotion analyzer 20 loads weights on the user's emotions recognized by the user emotion recognizers 122, 132, and 140. As a result, as shown in FIG. 4, weighted user emotions such as sadness of 60%, angriness of 30%, happiness of 10%, surprise of 0%, and neutral of 0% are output.

Referring to FIGS. 3 and 4, while the inputs of the user emotion analyzer 20 reflect relatively definite user's emotions, the inputs of the educational intention analyzer 18 are usually so vague that it is difficult to accurately analyze the educational intention. Accordingly, it is preferable to reflect the recognizing result output from the user emotion analyzer 20 upon the educational intention analyzer 18 so that the robot can be guided to perform an operation agreeing with the user's educational intention. Besides, the outputs of the growth state analyzer 32 and the object operation controller 30 can be reflected upon the education intention analyzer 18 so that the educational intention analyzer 18 can be trained to more accurately analyze the user's educational intention.

Although not shown, like the educational intention analyzer 18 or the user emotion analyzer 20, the object emotion analyzer 22 analyzes the emotion of the robot using some of the recognizers 122 through 140 included in the preprocessor 12.

Figure 5:
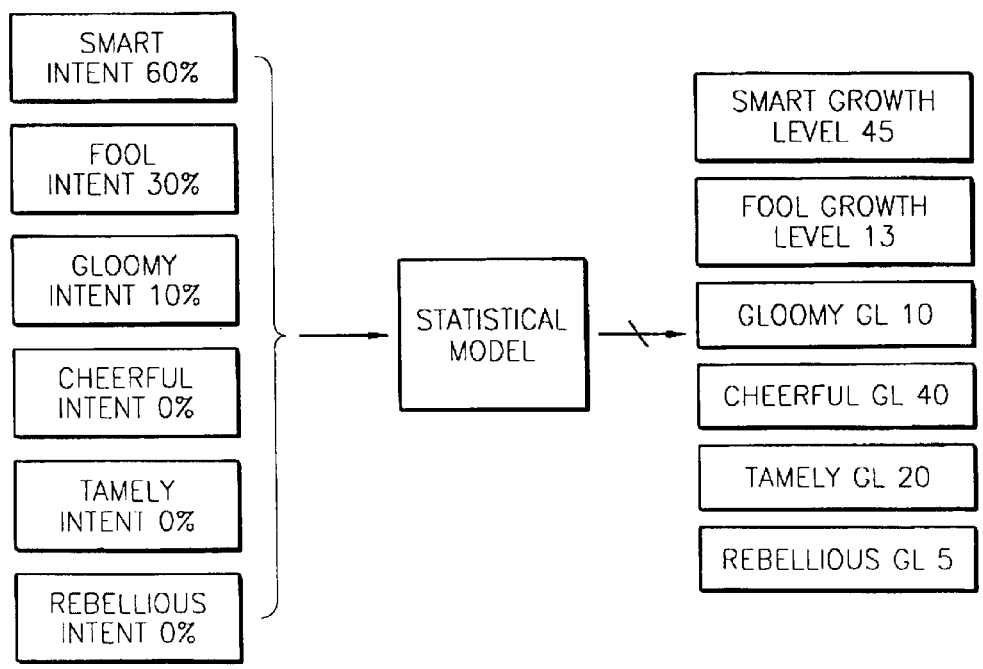
FIG. 5 is a diagram showing an embodiment of a procedure of analyzing a growth state of an object performed by a growth state analyzer shown in FIG. 1.

FIG. 5 is a diagram showing an embodiment of a procedure of analyzing a growth state of an object performed by the growth state analyzer 32 shown in FIG. 1. In FIG. 5, the growth state analyzer 32 analyzes inputs with respect to all predetermined tendencies, for example, smart tendency, foolish tendency, gloomy tendency, cheerful tendency, tamable tendency, and rebellious tendency, upon a predetermined statistical model to detect a growth state of the robot up to the present time and represents the growth state with the degree of educational attainment. Accordingly, if the robot, i.e., the object, receives various inputs agreeing with a selected educational intention from the user or environment, the growth state of the robot with respect to the selected educational intention is determined as in a high level. In contrast, if the robot receives various inputs having no relation with the selected educational intention from the user or environment, the growth state of the robot with respect to the selected educational intention is determined as in a low level. When the result of analyzing the user's educational intention is received, the growth state analyzer 32 changes a current growth state based on the received result. Referring to FIG. 5, a case where the user intends to grow the robot to be smart and cheerful will be described as an example. If predetermined tendencies represented with percentages, i.e., a smart tendency of 60%, a foolish tendency of 30%, a gloomy tendency of 10%, a cheerful tendency of 0%, a tamable tendency of 0%, and a rebellious tendency of 0%, are currently input, the growth state analyzer 32 analyzes the input using a predetermined statistical model. As a result, it appears that the growth level (GL) of the smart tendency is 45, the GL of the foolish tendency is 13, the GL of the gloomy tendency is 10, the GL of the cheerful tendency is 40, the GL of the tamable tendency is 20, and the GL of the rebellious tendency is 5. Accordingly, it can be inferred that the robot has been grown to have high smart and cheerful tendencies. In addition, it can be inferred from the percentages of the input tendencies that the user has a high educational intention on the smart tendency. For convenience sake, only the output of the educational intension analyzer 18 is used as the input of the growth state analyzer 32 which is used for analyzing the growth state in FIG. 5. However, as shown in FIG. 1, the growth state analyzer 32 can use the outputs of the user emotion analyzer 20 and the object emotion analyzer 22 in addition to the output of the educational intention analyzer 18 to analyze the growth state.

Figure 6:
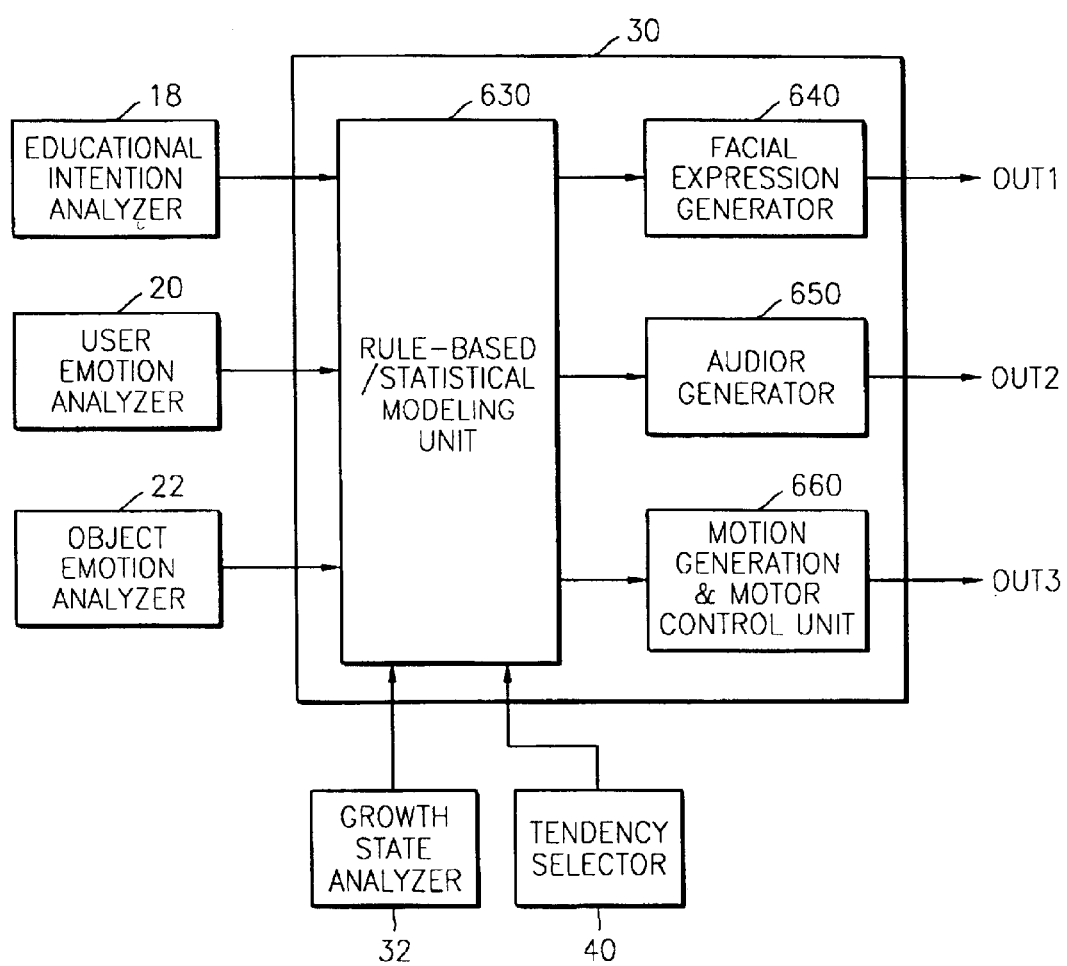
FIG. 6 is a diagram showing an embodiment of a procedure of analyzing a growth state of an object performed by an object operation controller shown in FIG. 1.

FIG. 6 is a diagram showing an embodiment of a procedure of analyzing the growth state of an object performed by the object operation controller 30 shown in FIG. 1. Referring to FIG. 6, the object operation controller 30 includes a rule-based/statistical modeling unit 630, a facial expression generator 640, an audio generator 650, and a motion generation and motor control unit 660.

Referring to FIG. 6, the rule-based/statistical modeling unit 630 of the object operation controller 30 applies a rule-based or statistical model to the outputs of the weighting unit 10, for example, the outputs of the educational intention analyzer 18, the user emotion analyzer 20, and the object emotion analyzer 22, and the output of the growth state analyzer 32 and generates first through third control signals for controlling the robot according to the result of application.

The facial expression generator 640 generates a first operation control signal OUT1 for controlling the facial expression of the robot in response to the first control signal. Here, the facial expression of the robot can be made using a device such as an LED. In this case, the first operation control signal OUT1 is a signal for controlling the on/off operation or the brightness of the LED.

The audio generator 150 generates a signal corresponding to sound made by the robot reacting the user or environment as a second operation control signal OUT2 in response to the second control signal. Here, the robot is provided with a speaker, and the second operation control signal OUT2 is amplified through the speaker to allow the user to recognize it.

The motion generation and motor control unit 160 generates a signal for controlling the entire motion of the robot as a third operation control signal OUT3 in response to the third control signal. For example, the robot is provided with motors for motions of its arms, legs, and body, and the third operation control signal OUT3 controls the motors to control the entire motion of the robot.

As described above, in the case where an object growth control system of the present invention is applied to a robot, the robot is educated to agree with an object growth tendency selected by a user or the user's tendency, thereby increasing the user's affection and satisfaction on the robot.

In the above, the case where the object growth control system of the present invention is applied to a robot has been described. In another case, the object growth control system of the present invention can be applied to, for example, an air conditioner. Hereinafter, the operations of the object growth control system of the present invention applied to an air conditioner will be described with reference to the attached drawings.

Figure 7:
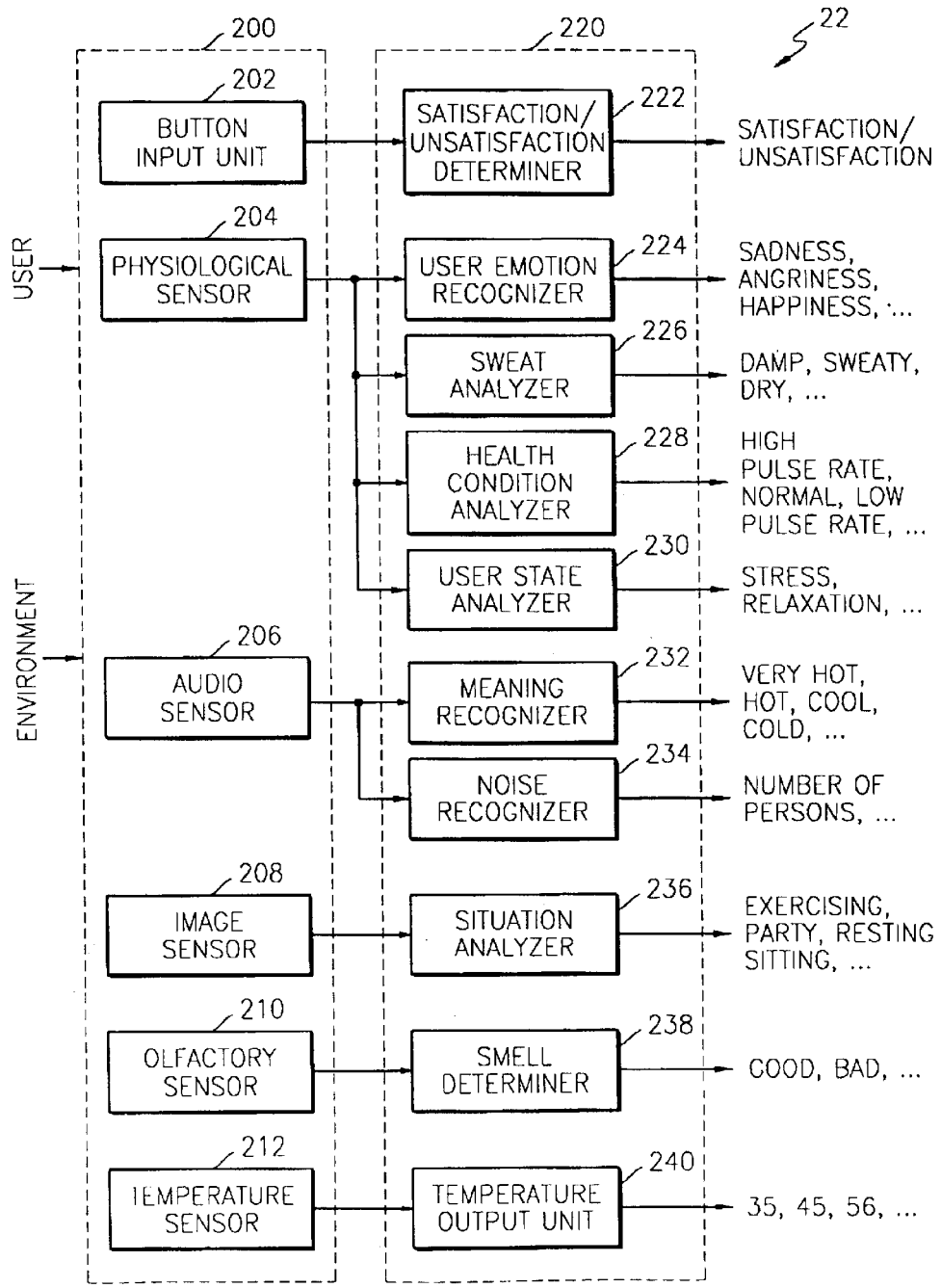
FIG. 7 is a detailed block diagram of another embodiment of the pre-processor of the weighting unit shown in FIG. 1.

FIG. 7 is a detailed block diagram of another embodiment of the pre-processor 12 of the weighting unit 10 shown in FIG. 1. The pre-processor 12 includes a sensor unit 200 and a processor unit 220.

Referring to FIG. 7, the sensor unit 200 senses a user's state and a state of an environment, converts them into electrical signals, and outputs the electrical signals as the sensing result to the processor unit 220. The sensor unit 100 includes a button input unit 202, a physiological sensor 204, an audio sensor 206, an image sensor 208, an olfactory sensor 210, and a temperature sensor 212.

The button input unit 202 senses the user's operation of a remote controller (not shown) for controlling the air conditioner.

The physiological sensor 204 senses the user's physiological conditions such as the amount of sweat, a pulse rate, a body temperature, and a blood pressure.

The audio sensor 206 senses speech spoken by the user or noise from the environment.

The image sensor 208 senses the user's state of a state of environment. For example, the image sensor 208 senses the user's motion, ambient color, the user's behavior, and the user's location.

The olfactory sensor 210 senses ambient smell. The temperature sensor 212 senses ambient temperature.

Then, the processor unit 220 converts each of the sensing results received from the sensor unit 220 into information indicating the user's educational intention or information indicating the user's emotional state.

In the processor unit 220, a satisfaction/unsatisfaction determiner 222 determines whether the user is satisfied with a current state based on the sensed result from the button input unit 202, i.e., the user's operation on the remote controller or buttons on the air conditioner and outputs the result of determination.

A user emotion recognizer 224 recognizes the user's emotional state such as sadness, angriness, or happiness based on the sensing results, for example, a pulse rate, body temperature, the amount of sweat, and blood pressure, output from the physiological sensor 204 and outputs the result of recognition.

The sweat analyzer 226 analyzes the sensing results received from the physiological sensor 204 and outputs the result of analysis as being damp, sweaty, or dry.

The health condition analyzer 228 analyzes the sensing results received from the physiological sensor 204 to determine the user's health condition and outputs the result of analysis as a high, normal, or low pulse rate.

The user state analyzer 230 analyzes the sensing results received from the physiological sensor 204 to determine the user's physical condition and outputs the result of analysis as stress or relaxation.

The meaning recognizer 232 recognizes the meaning of speech spoken by the user from the sensing result received from the audio sensor 206, determines a current temperature condition, and outputs the result of determination as being very hot, hot, cool, or cold.

The noise recognizer 234 recognizes ambient noise but the user's speech from the sensing result received from the audio sensor 206, detects a current environment, for example, the number of persons, and outputs the result of detection.

The situation analyzer 236 determines the user's situation from the sensing result received from the image sensor 208 and outputs the result of determination as being exercising, in a party, resting, or sitting.

The smell determiner 238 determines whether the ambient smell is good or bad based on the sensing result received from the olfactory sensor 210 and outputs the result of determination.

The temperature output unit 240 outputs a current temperature based on the sensing result received from the temperature sensor 212.

Figure 8:
FIG. 8 is a diagram showing another embodiment of a weighting procedure performed in the educational intention analyzer shown in FIG. 1.

FIG. 8 is a diagram showing another embodiment of a weighting procedure performed in the educational intention analyzer 18 shown in FIG. 1. In FIG. 8, the educational intention analyzer 18 analyzes the user's educational intention using the output of the satisfaction/unsatisfaction determiner 222 of the processor unit 220. However, according to circumstances, the user's educational intention can be analyzed using the outputs of other units of the processor unit 220. If the result of determination output from the satisfaction/unsatisfaction determiner 222 is satisfaction, a weight of 100% is loaded on a tendency of satisfaction, and a weight of 0% is loaded on a tendency of unsatisfaction. In contrast, the result of determination is unsatisfaction, weights are loaded on the tendencies of satisfaction and unsatisfaction in opposite way to the case of satisfaction.

Figure 9:
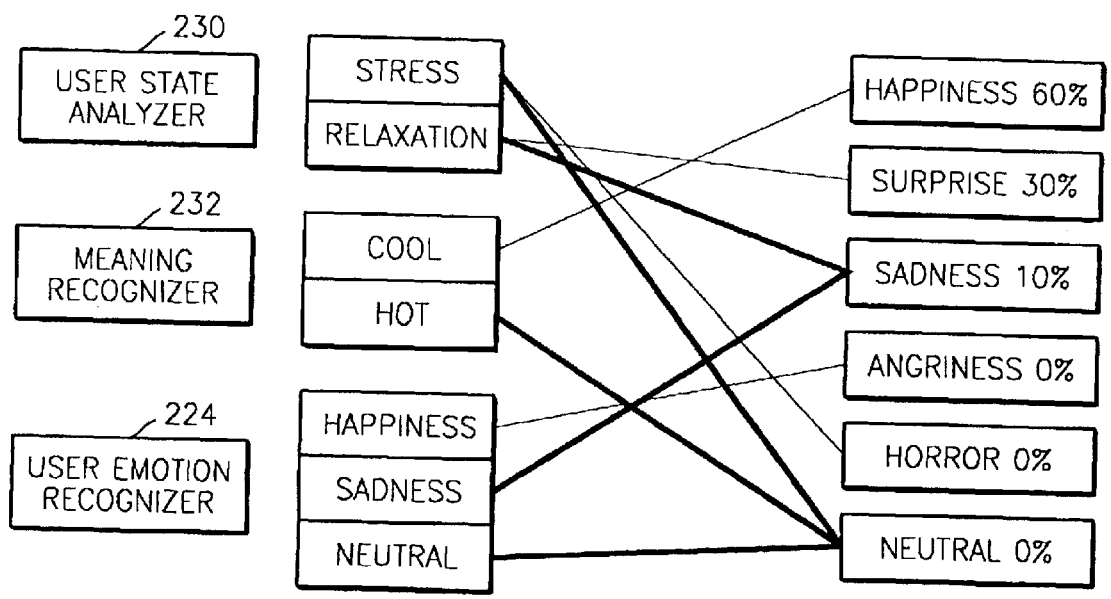
FIG. 9 is a diagram showing another embodiment of a procedure of analyzing a user's emotion performed by the user emotion analyzer shown in FIG. 1.

FIG. 9 is a diagram showing another embodiment of a procedure of analyzing a user's emotion performed by the user emotion analyzer 20 shown in FIG. 1. In FIG. 9, the user emotion analyzer 20 analyzes the user's emotion using the outputs of the user state analyzer 230, the meaning recognizer 232, and the user emotion recognizer 224. However, according to circumstances, the user's emotion can be analyzed using the outputs of other units of the processor unit 220.

Referring to FIG. 9, the user emotion analyzer 20 loads weights on the user's emotions such as happiness, surprise, sadness, angriness, horror, and neutral according to influences of the results such as happiness, sadness, and neutral output from the user emotion recognizer 224, the results such as stress and relaxation output from the user state analyzer 230, and the results such as cool and hot output from the meaning recognizer 232. For example, it can be inferred from FIG. 9 that the result, stress, output from the user state analyzer 230 influences "horror" and "neutral" among the user's emotions. In addition, it can be inferred from the thickness of lines connected between the "stress" and "horror" and "neutral" that the result "stress" influences "neutral" more than "horror". In another example, the result "cool" output from the meaning recognizer 232 influences "happiness" among the user's emotions. As described above, the user's current emotional state can be analyzed by loading weights on the user's predetermined emotions according to the results of recognition. The results of analysis of the user's emotional state can be represented with a predetermined scale like happiness of 60%, surprise of 30%, sadness of 10%, angriness of 0%, horror of 0%, and neutral of 0%, as shown in FIG. 9.

Figure 10:
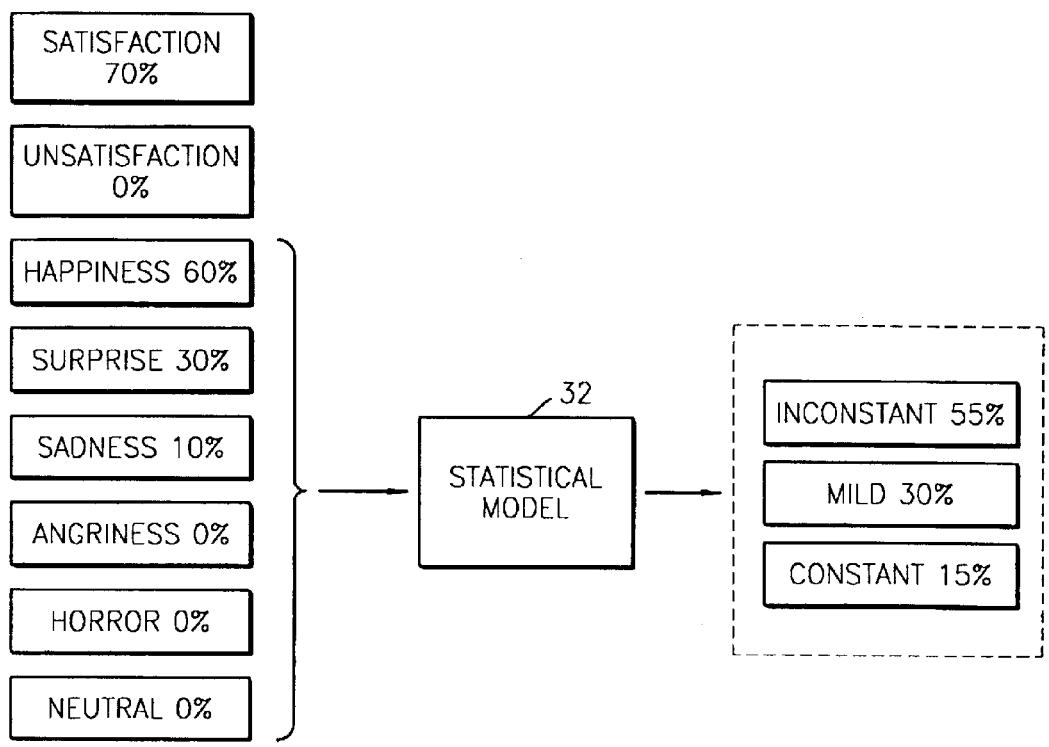
FIG. 10 is a diagram showing another embodiment of a procedure of analyzing a growth state of an object performed by the growth state analyzer shown in FIG. 1.

FIG. 10 is a diagram showing another embodiment of a procedure of analyzing a growth state of an object performed by the growth state analyzer 32 shown in FIG. 1. The growth state analyzer 32 receives the outputs of the user emotion analyzer 20 and the object emotion analyzer 22 as current inputs, determines the current growth state of the air conditioner by modeling the inputs up to the present time, and represents the growth state with the degree of educational attainment. Here, the output of the educational intention analyzer 18, i.e., satisfaction or unsatisfaction, can be used as an input of the growth state analyzer 32 for analysis of the growth state. A predetermined statistical model is applied to the outputs of the educational intention analyzer 18, the user emotion analyzer 20, and the object emotion analyzer 22, as shown in FIG. 10. Tendencies of the air conditioner which can be selected through the tendency selector 40 may be "immediately changing according to the user's feeling", "constant", "inconstant", "mild", and "like spring". The growth state obtained by the growth state analyzer 32 in FIG. 10 has the "inconstant" tendency of 55%, the "constant" tendency of 15%, and the "mild" tendency of 30%. If the air conditioner, i.e., the object, receives various inputs agreeing with a selected educational intention from the user or environment, the growth state of the air conditioner with respect to the selected educational intention is determined as in a high level. In contrast, if the air conditioner receives various inputs having no relation with the selected educational intention from the user or environment, the growth state of the air conditioner with respect to the selected educational intention is determined as in a low level. When the result of analyzing the user's educational intention is received, the growth state analyzer 32 changes a current growth state based on the received result.

Figure 11:
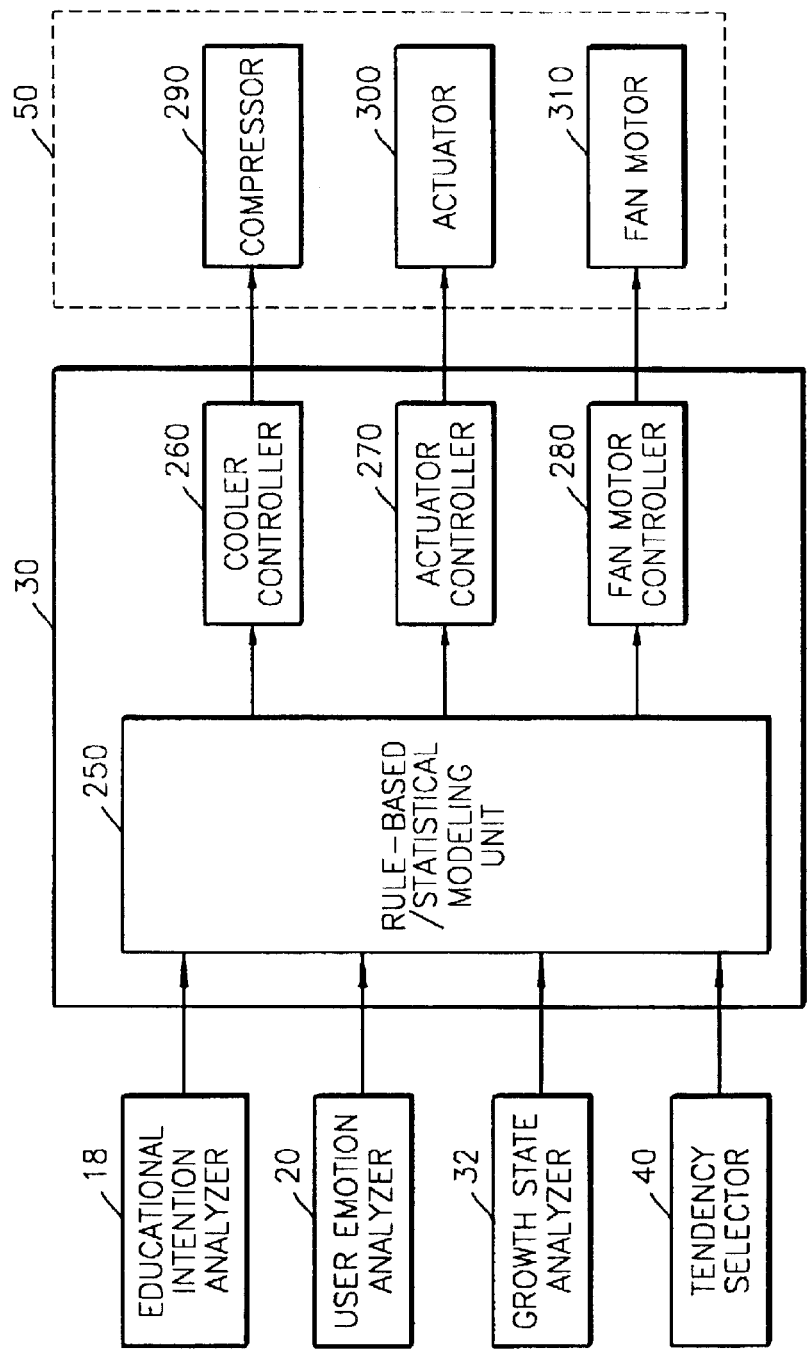
FIG. 11 is a diagram showing another embodiment of a procedure of analyzing a growth state of an object performed by the object operation controller shown in FIG. 1.

FIG. 11 is a diagram showing another embodiment of a procedure of analyzing a growth state of an object performed by the object operation controller 30 shown in FIG. 1. Referring to FIG. 11, the object operation controller 30 includes a rule-based/statistical modeling unit 250, a cooler controller 260, an actuator controller 270, and a fan motor controller 280.

The rule-based/statistical modeling unit 250 of the object operation controller 30 applies a rule-based or statistical model to the outputs of the weighting unit 10, for example, the outputs of the educational intention analyzer 18, the user emotion analyzer 20, and the object emotion analyzer 22, and the output of the growth state analyzer 32 and generates first through third control signals according to the result of application.

The cooler controller 260 controls a compressor 290 of the reaction unit 50 in the air conditioner in response to the first control signal.

The actuator controller 270 controls an actuator 300 of the reaction unit 50 in the air conditioner in response to the second control signal.

The fan motor controller 280 controls a fan motor 310 of the reaction unit 50 in the air conditioner in response to the third control signal.

As described above, the compressor 290, the actuator 300, and the fan motor 310 of the reaction unit 50 in the air conditioner are controlled in response to the operation control signals generated in the object operation controller 30, so the state of the air conditioner is controlled.

The above-described case where the object growth control system of FIG. 1 is applied to an air conditioner is a case in which it is difficult for a user or an object to determine what particular physical feature is produced by an educational intention selected by the user. The air conditioner is educated with respect to the user's emotion through the user's using pattern and the degree of the user's satisfaction received in real time. Through the training procedure, the user's educational intention can gradually effect a positive result. In the case where the user selects a tendency of quickly responding to the user's variable emotional state as a growth tendency, the object operation controller 30 for the air conditioner must solve a problem which can be expressed by Equation (1).

$$A = \alpha * (\text{user's emotional state}) \tag{1}$$

Here, A indicates gain determining the response speed of the air conditioner, and $\alpha$ indicates an air conditioner characteristic variable for determining the gain.

The user can vaguely set a growth tendency as "quick response" but cannot set a "specific speed". In other words, detecting a specific value of $\alpha$ is a problem that the air conditioner faces. In this case, the user educates the air conditioner using a satisfaction/unsatisfaction button on a remote controller. As a result, the object operation controller 32 can determine a value of $\alpha$ according to Equation (2).

$$\alpha = a(\text{output of growth state analyzer}) + b(\text{current output of educational intention analyzer}) + c \tag{2}$$

Here, "a", "b", and "c" can be set randomly as long as satisfying a>b>c.

When $\alpha$ is determined by Equation (2), gain A determining the response speed is determined in association with the user's current emotional state by Equation (1). According to the result of determination, the air conditioner is controlled.

As described above, in the case where an object growth control system of the present invention is applied to an air conditioner, the air conditioner is educated to agree with an object growth tendency selected by a user or the user's tendency, thereby increasing the user's satisfaction on the air conditioner.

The present invention can be embodied as a code which can be read on a computer and is recorded in a computer-readable recording medium. The computer-readable recording medium is any kind of recording device in which data that can be read on a computer system is stored. The computer-readable recording medium can be a ROM, a RAM, a CD-ROM, a magnetic tape, a floppy disc, or an optical data storage device. In addition, the computer-readable recording medium can be realized as a carrier wave (for example, transmission through the Internet). The computer-readable recording medium can be distributively stored in computer readable recording media in computer systems connected through a network and can be executed.

As described above, according to an object growth control system of the present invention, a user can make an object have personal tendency. The present invention allows the user to grow the object to agree with the user's favorable tendency, thereby increasing the user's affection on the object. In addition, since the user's intention and emotional state can be analyzed using an environment in addition to the user's current state, the object may output a result different from an adequately predicted result so that the user can keep up an interest in the object for a long time without being bored.

In drawings and specification, there have been disclosed preferred embodiments of the present invention and, although specific terms are employed, they are used in descriptive sense only and not for purposes of limiting the scope of the invention being set fourth in the following claims. Therefore, it will be understood by those skilled in the art that various changes in form and details may be made in the embodiments. Accordingly, the true scope of the invention will be defined by the technological spirit of the appended claims.

What is claimed is:

1. An object growth control system for growing an object, comprising:

a weighting unit for detecting external environments and a user's state, loading weights on predetermined user emotional states, predetermined object growth tendencies, and predetermined object emotional states according to the result of detection and the user's tendency, and outputting the results of loading of the weights as state data;

a growth state analyzer for applying a predetermined statistical model to the state data input for a predetermined period to analyze the user's tendency and outputting a degree of education on the object with respect to the user's tendency based on the state data to which the predetermined statistical model has been applied; and an object operation controller for applying a predetermined rule-based or statistical model to the state data and the degree of education to generate a control signal for controlling the operation of the object.

2. The object growth control system of claim 1, wherein the user's tendency is determined as at least one selected from among the predetermined object growth tendencies.

3. The object growth control system of claim 1, wherein the weighting unit receives the outputs of the growth state analyzer and the object operation controller through feedback and reflects them on weighting the predetermined user emotional states, the predetermined object growth tendencies, and the predetermined object emotional states.

4. The object growth control system of claim 1, wherein the weighting unit comprises:

a pre-processor for sensing the user's state and a state of an ambient environment and converting the result of sensing into information indicating a state or emotion of the user or the object;

an educational intention analyzer for loading weights on the predetermined object growth tendencies according to the information indicating the user's state or emotion and outputting weighted object growth tendencies;

a user emotion analyzer for loading weights on the predetermined user emotional states according to the information indicating the user's state or emotion and outputting weighted user emotional states; and an object emotion analyzer for loading weights on the predetermined object emotional states according to the information indicating the object's state or emotion, and outputting weighted object emotional states.

5. The object growth control system of claim 4, wherein the educational intention analyzer receives the output of the user emotion analyzer and reflects it on weighting the predetermined object growth tendencies.

6. The object growth control system of claim 4, wherein the educational intention analyzer receives the outputs of the growth state analyzer and the object operation controller and reflects them on weighting the predetermined object growth tendencies.

7. The object growth control system of claim 4, wherein the user emotion analyzer receives the output of the education intension analyzer and reflects it on weighting the predetermined user emotional states.

8. An object growth control method for growing an object, comprising the steps of:

detecting external environments and a user's state, loading weights on predetermined user emotional states, predetermined object growth tendencies, and predetermined object emotional states according to the result of detection and the user's tendency, and outputting the results of loading of the weights as state data;

applying a predetermined statistical model to the state data input for a predetermined period to analyze the user's tendency and outputting a degree of education on the object with respect to the user's tendency based on the state data to which the predetermined statistical model has been applied; and applying a predetermined rule-based or statistical model to the state data and the degree of education to generate control signals for controlling the operation of the object.

9. A computer readable recording medium encoded with processing instructions for performing an object growth control method for growing an object in a computer, the method comprising:

detecting external environments and a user's state, loading weights on predetermined user emotional states, predetermined object arowth tendencies, and predetermined object emotional states according to the result of detection and the user's tendency, and outputting the results of loading of the weights as state data;

applying a predetermined statistical model to the state data input for a predetermined period to analyze the user's tendency and outputting a degree of education on the object with respect to the user's tendency based on the state data to which the predetermined statistical model has been applied; and applying a predetermined rule-based or statistical model to the state data and the degree of education to generate control signals for controlling the operation of the object.

10. An object growth control system for growing an object, comprising:

a tendency selector for setting a plurality of growth tendencies, which the object can be educated or controlled to have, as object growth tendencies and providing at least one object growth tendency selected by a user;

a weighting unit for detecting external environments and a user's state, loading weights on predetermined user emotional states, predetermined object growth tendencies, and predetermined object emotional states according to the result of detection and the selected object growth tendency, and outputting the results of loading of the weights as state data;

a growth state analyzer for applying a predetermined statistical model to the state data and outputting a degree of education on the object with respect to the selected object growth tendency based on the result of application; and an object operation controller for applying a predetermined rule-based or statistical model to the state data and the degree of education to generate a control signal for controlling the operation of the object.

11. The object growth control system of claim 10, wherein when calculating the degree of education using the predetermined statistical model, the growth state analyzer loads weights on the one or more selected object growth tendencies and the other unselected object growth tendencies such that the sum of the weights loaded on the one or more selected object growth tendencies exceeds the sum of the weights loaded on the unselected object growth tendencies.

12. The object growth control system of claim 10, wherein when generating the control signal using the predetermined statistical model, the object operation controller loads weights on the one or more selected object growth tendencies and the other unselected object growth tendencies such that the sum of the weights loaded on the one or more selected object growth tendencies exceeds the sum of the weights loaded on the unselected object growth tendencies.

13. The object growth control system of claim 10, wherein the weighting unit receives the outputs of the growth state analyzer and the object operation controller through feedback and reflects them on weighting the predetermined user emotional states, the predetermined object growth tendencies, and the predetermined object emotional states.

14. The object growth control system of claim 10, wherein the weighting unit comprises:

a pre-processor for sensing the user's state and a state of an ambient environment and converting the result of sensing into information indicating a state or emotion of the user or the object;

an educational intention analyzer for loading weights on the predetermined object growth tendencies according to the information indicating the user's state or emotion and the one or more selected object growth tendencies and outputting weighted object growth tendencies;

a user emotion analyzer for loading weights on the predetermined user emotional states according to the information indicating the user's state or emotion and the one or more selected object growth tendencies and outputting weighted user emotional states; and an object emotion analyzer for loading weights on the predetermined object emotional states according to the information indicating the object's state or emotion and the one or more selected object growth tendencies and outputting weighted object emotional states.

15. The object growth control system of claim 14, wherein the educational intention analyzer receives the output of the user emotion analyzer and reflects it on weighting the predetermined object growth tendencies.

16. The object growth control system of claim 14, wherein the educational intention analyzer receives the outputs of the growth state analyzer and the object operation controller and reflects them on weighting the predetermined object growth tendencies.

17. The object growth control system of claim 14, wherein the user emotion analyzer receives the output of the education intension analyzer and reflects it on weighting the predetermined user emotional states.

18. An object growth control method for growing an object, comprising the steps of:

setting a plurality of growth tendencies, which the object can be educated or controlled to have, as object growth tendencies;

requesting a user to select at least one object growth tendency among the set object growth tendencies;

detecting external environments and a user's state and loading weights on predetermined user emotional states, predetermined object growth tendencies, and predetermined object emotional states according to the result of detection and the selected object growth tendency to generate weighted state data;

applying a predetermined statistical model to the state data and calculating a degree of education on the object with respect to the selected object growth tendency based on the result of application; and applying a predetermined rule-based or statistical model to the state data and the degree of education to generate a control signal for controlling the operation of the object.

19. A computer readable recording medium encoded with processing instructions for performing an object growth control method for growing an object in a computer, the method comprising:

setting a plurality of growth tendencies, which the object can be educated or controlled to have, as object growth tendencies;

requesting a user to select at least one object growth tendency among the set object growth tendencies;

detecting external environments and a user's state and loading weights on predetermined user emotional states, predetermined object growth tendencies, and predetermined object emotional states according to the result of detection and the selected object growth tendency to generate weighted state data;

applying a predetermined statistical model to the state data and calculating a degree of education on the object with respect to the selected object growth tendency based on the result of application; and applying a predetermined rule-based or statistical model to the state data and the degree of education to generate a control signal for controlling the operation of the object.

* * * * *